United States Patent [19]

Ida et al.

[11] Patent Number: 5,097,367

[45] Date of Patent: Mar. 17, 1992

[54] CASSETTE HOLDING STRUCTURE FOR A CASSETTE TAPE PLAYER

[75] Inventors: Mitsuru Ida, Saitama; Yasuhiro Yamaguchi, Kanagawa, both of Japan

[73] Assignee: Sony Corporation, Tokyo, Japan

[21] Appl. No.: 425,409

[22] Filed: Oct. 23, 1989

[30] Foreign Application Priority Data

Oct. 31, 1988 [JP] Japan ............... 63-142350[U]

[51] Int. Cl.$^5$ ............... G11B 5/008; G11B 15/00; G11B 17/00
[52] U.S. Cl. ............... 360/96.6; 360/93; 360/96.5
[58] Field of Search ............... 360/96.6, 96.5, 93, 360/90, 137

[56] References Cited

U.S. PATENT DOCUMENTS

| | | | |
|---|---|---|---|
| 4,593,331 | 6/1986 | Tomita | 360/96.6 |
| 4,649,453 | 3/1987 | Iwasawa | 360/96.6 |
| 4,812,931 | 3/1989 | Shibaike | 360/96.6 |

FOREIGN PATENT DOCUMENTS

| | | | |
|---|---|---|---|
| 3115089 | 2/1982 | Fed. Rep. of Germany. | |
| 60-175283 | 9/1985 | Japan. | |
| 62-42358 | 2/1987 | Japan. | |
| 63-273252 | 11/1988 | Japan | 360/96.6 |
| 2092808 | 8/1982 | United Kingdom. | |

Primary Examiner—Aristotelis Psitos
Assistant Examiner—Alfonso Garcia

[57] ABSTRACT

A cassette tape player utilizes a tape cassette having apertures formed through one side wall of its casing to accept a magnetic head and a pinch roller. The cassette tape player has a body assembly on which the tape cassette is freely loaded or unloaded and a lid supported by the body assembly so as to be freely rotatable for closing and opening the cassette tape player. The tape cassette is inserted into a loading region of the body assembly by closing the lid. A head assembly chassis is supported by one side end portion of the cassette loading portion so that its moves together with the lid. The head assembly also supports a magnetic head holder and the pinch roller. The tape cassette is supported by securing the upper surface wall of the cassette casing by inserting cassette holding members into the pinch roller insertion openings of the tape cassette. These holding members which are substantially parallel to the inner top wall of the lid support one side of the upper surface wall of the tape cassette while spring members provide opposing pressure to the opposite side of the upper surface wall of the tape cassette. The holding member and spring member combination hold the tape cassette for loading in a compact arrangement to ensure efficient use of space in the cassette tape player.

20 Claims, 11 Drawing Sheets

CASSETTE HOLDING STRUCTURE FOR A CASSETTE TAPE PLAYER

BACKGROUND OF THE INVENTION

1. Field of the Invention

The present invention relates generally to a cassette holding apparatus for a cassette tape player. More particularly, this invention relates to a cassette holding apparatus for a cassette tape player which utilizes a Philips type compact tape cassette having a cassette casing with an opening in one side wall for insertion of a magnetic head and a pinch roller therein. The tape cassette of the present invention includes a lid for opening and closing the portion of a cassette loading portion where a tape cassette is freely loaded and/or unloaded and is supported. The cassette is secured in the region of the side wall with the opening. A head assembly chassis is supported at one side end of the cassette loading portion so that it can be moved in unison with the lid. The cassette loading portion also supports a magnetic head and a pinch roller arm.

2. Description of the Prior Art

Generally, a cassette tape player utilizes a cassette type magnetic tape, i.e., a tape cassette in which tape reels having a magnetic tape wound therearound are rotatably accommodated within a cassette casing.

Various loading systems for loading the tape cassette on the cassette loading portion in the cassette tape player are available. One of such cassette loading systems will be explained below. According to this cassette loading system, there is provided a cassette loading portion on which a tape cassette is loaded, a lid for opening and closing an opening of the cassette loading portion, and a cassette holding portion which moves in unison with the lid. In this case, when the lid is moved to its opened position, the tape cassette is held by the cassette loading portion and then the lid is moved from that position to its closing position so the tape cassette is loaded on the cassette holding portion. Japanese Published Utility Model No. 63-31244 discloses the abovementioned cassette tape player.

Most of the prior-art cassette holding structures, in cassette tape players, have two supporting portions with openings of substantially U-letter configurations which are opened in the opposite direction. These two holding portions grip the tape cassette at their side portions from the outside of the cassette casing. Accordingly, the width of the prior art cassette holding structure, or the size of the prior art cassette holding structure, in the thickness direction of the tape cassette is larger than the thickness of the tape cassette. Such a holding structure makes it difficult to reduce the thickness of the cassette tape player. In addition, even when the lid is opened, the bottom region of its holding portion is located near the bottom wall of the cassette loading portion, making it difficult to provide desired operation members and mechanisms in that area. This leads to the problem that the space of the cassette loading portion can not be utilized efficiently.

Since it is desired that the above-noted lid be capable of opening as much as possible so long as it does not disturb the loading and/or unloading of the tape cassette from the cassette holding means, some restricting means is required in order to restrict the opening angle of the lid. In the prior art cassette tape players, an opening angle restricting portion is integrally formed with the lid on or near the rotation fulcrum portion of the lid. Alternatively, a restricting member may be independently fixed to the lid, making the structure more complicated due to an increased number of assembly parts.

Furthermore, in this kind of the cassette tape player, the tape cassette can be loaded on the cassette holding structure both in the correct direction and in the incorrect direction. Alternatively, the tape cassette can be directly loaded on the cassette loading portion even when the tape cassette is not loaded on the cassette holding structure. When this occurs, a risk that the cassette casing will collide with the magnetic head and other parts arises. In order to eliminate the abovementioned risk, the cassette holding structure and the cassette loading portion are provided with additional members for avoiding the tape cassette from being loaded on the cassette loading portion in an incorrect manner. This assembly also provides an increased number of assembly parts in the cassette tape player.

SUMMARY OF THE INVENTION

Accordingly, it is a general object of the present invention to provide an improved cassette holding apparatus for a cassette tape player which can eliminate the above-noted problems encountered in the prior art.

More specifically, it is an object of the present invention to provide a cassette holding apparatus for a cassette tape player which includes a lid and a cassette holding member protruded from respective end portions of the upper surface portion of a head assembly chassis. This head assembly chassis moves in unison with the lid while remaining substantially parallel to an inner top wall of the lid and a cassette pushing spring. When the cassette holding apparatus is inserted into the portion of the tape cassette with an opening, the cassette pushing spring is brought in contact with the upper wall of the tape cassette to hold the tape cassette on the head assembly chassis.

It is another object of the present invention to provide a cassette holding apparatus for a cassette tape player in which a head protecting protrusion structure is integrally formed with the cassette holding apparatus. This protrusion structure prevents the tape cassette from colliding with the magnetic head when it is loaded on the cassette holding apparatus in an incorrect direction.

It is still another object of the present invention to provide a cassette holding apparatus for a cassette tape player in which a head protecting protrusion structure is integrally formed with the cassette holding apparatus. When the side wall of a tape cassette without the opening is inserted into the cassette holding apparatus, it contacts the head protecting protrusion structure before contacting the magnetic head.

It is still another object of the present invention to provide a cassette holding apparatus for a cassette tape player which includes a leaf spring member and a cassette pushing portion. This pushing portion protrudes substantially parallel from the upper surface portion to an inner top surface of a lid. A restricting portion extends in the direction substantially vertical to the inner top surface that is integrally formed. The leaf spring member is attached to a head assembly chassis which is movable together with the lid. The restricting portion is slidably engaged with a guide portion formed on a cassette loading portion so, when the lid is opened, the rotation angle of the lid is restricted by the restricting portion of the leaf spring member and the guide portion.

It is a further object of the present invention to provide a cassette holding apparatus for a cassette tape player having a foldable link structure for coupling the lid and the housing body. The link structure is provided with a mis-loading preventing portion which protrudes from the link structure in a lateral direction. When the tape cassette is directly loaded on a cassette loading portion without being held on the cassette holding structure, damage to the tape player may occur. The tape cassette can be prevented from being loaded on the cassette loading portion by the above-mentioned mis-loading preventing portion.

The above objects are achieved in a cassette holding apparatus for a cassette tape player constructed in accordance with principles of the present invention which includes a holding member and spring member arrangement. A lid is rotatably supported by a tape player body having a loading region. A head assembly chassis which supports a magnetic head and pinch roller, is fixed to the lid so it moves in unison with it. Integrated into the head assembly chassis is a holding member and a spring member. The holding member inserts into the pinch roller apertures in the tape cassette housing. The spring member provides pressure on the outside of cassette housing in opposition to the pressure provided by the holding member. As a result, one wall of the cassette housing is gripped by the holding member and spring member arrangement to secure the entire tape cassette on the head assembly chassis. After the tape cassette is secured, the lid can be closed to move the tape cassette to the loading region. Once the lid is closed, the tape cassette is loaded and ready for any tape player operation such as playback, fast forward, or rewind.

Further, the present invention includes a magnetic head protection member mis-loading prevention arrangement for preventing damage to the tape player. Integrated into the head assembly chassis are protrusions which extend beyond the magnetic head and pinch rollers. When a tape cassette is inserted in an incorrect direction, with the end of the tape cassette without apertures forward, the protrusions prevent the tape cassette housing from contacting the magnetic head or pinch rollers.

To prevent against direct loading of the tape cassette into the loading region without first securing to the holding member and spring member arrangement, a mis-loading apparatus is provided. When the lid is opened, a freely link arm arrangement unfolds to secure the lid in the open position. On one of the arms protrudes a plate which is integrated into the arm, which physically blocks a tape cassette from entering directly into the loading region. The only way to enter the loading region is to first hold the tape cassette on the holding and spring member arrangement. Then, the tape cassette can be moved into the loading region via closing the tape player lid.

These and other objects, features and advantages of the present invention will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Figure 1:
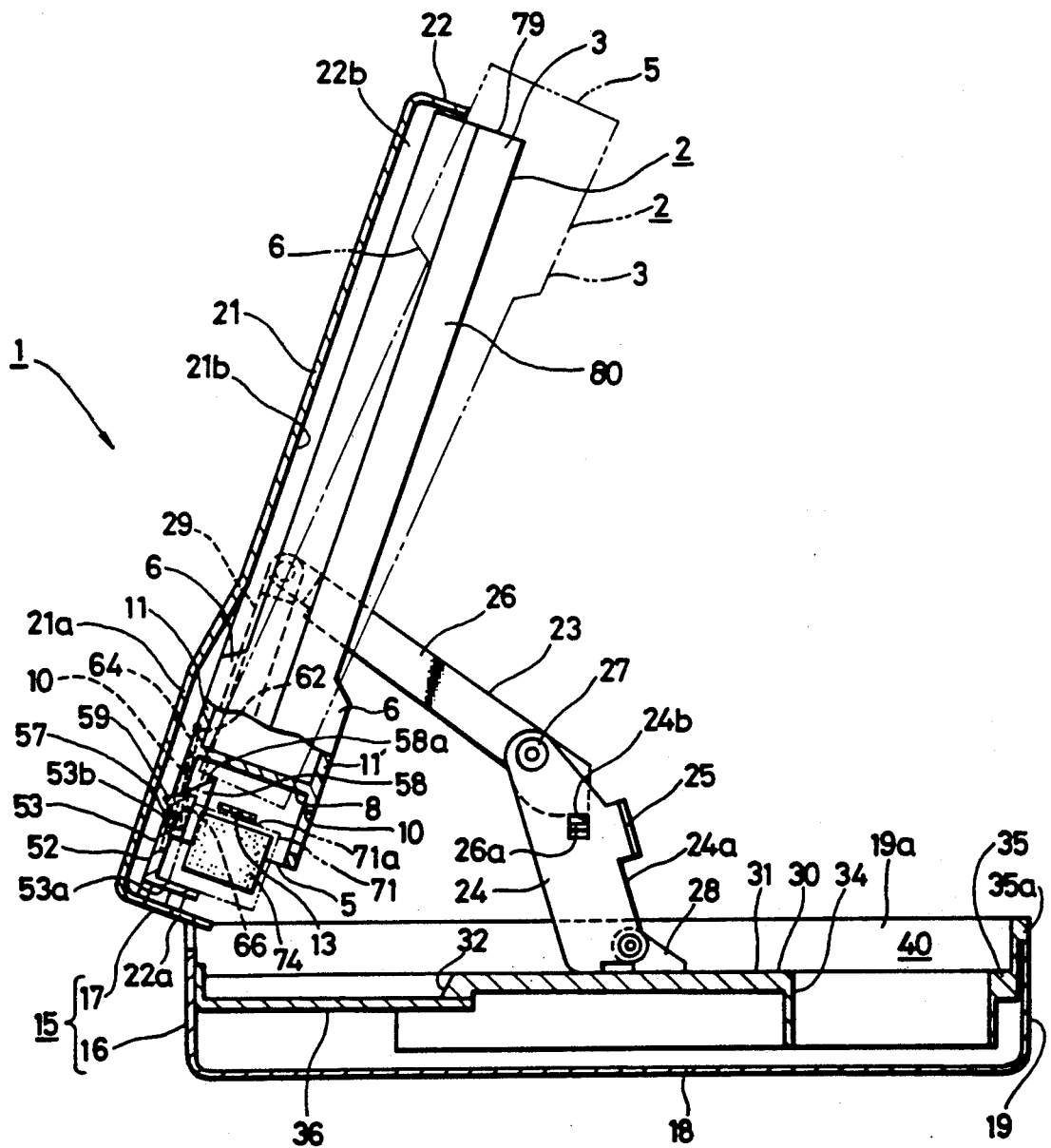
FIG. 1 is a vertical, cross-sectional view of a cassette tape layer with a tape cassette held on a head portion chassis.

A cassette holding apparatus for a cassette tape player according to an embodiment of the present invention will hereinafter be described in detail with reference to the drawings.

In this embodiment, the present invention is suitable for application to a cassette tape player 1 using a Philips tape compact tape cassette. A tape cassette will be described first prior to the cassette tape player 1.

Referring to FIG. 1 and FIGS. 9-11, there is shown a compact tape cassette 2. The tape cassette 2 has a thin cassette housing 3, which is substantially rectangular in shape, and two tape reels 4, 4 which are substantially annular in shape and rotatably accommodated within the cassette housing 3.

The cassette housing 3 is formed such that portion 6 includes one side wall 5 (hereinafter referred to as a front side wall). Portion 6 is in the shape of a trapezoid with the longer side of the trapezoid situated at the outer edge of the cassette tape. The longer side is only slightly larger than the short side of the trapezoid. Five openings 7, 8, 8 and 9, 9 have substantially rectangular configurations and are formed through the front side wall 5 in the area corresponding to the thick portion 6. The above-noted five openings 7, 8, 8 and 9, 9 will be described in more detail below. The opening 7 is located at the center of the front side wall 5 to form a head insertion opening into which a magnetic head will be inserted. The two openings 8 and 8 are located at both ends of the front side wall 5 that corresponds to portion 6. They form pinch roller insertion openings into which pinch rollers will be inserted. The remaining two openings 9 and 9 form tape guide insertion openings into which tape guides will be inserted.

There are formed capstan insertion openings 10 and 10 through the cassette housing 3 in its width direction inside the pinch roller insertion openings 8 and 8.

Two wall portions 11 and 11' are on opposite sides of each other in the width direction of the cassette housing 3, and two reel insertion apertures 12 and 12 are formed through the two wall portions 11 and 11' so as to become separated from each other with aperture 12 in wall portion 11 situated over aperture 12 in wall portion 11'. The above-noted two tape reels 4 and 4 are each positioned to be substantially coaxial with reel insertion apertures 12 and 12.

A magnetic tape 13 of a predetermined length is wound around the two tape reels 4 and 4 with both its ends fixed to the tape reels 4 and 4 respectively. One portion of the magnetic tape 13 travels along a tape path 14 (see FIG. 11) and in parallel to the front side wall 5 of the cassette housing 3. The magnetic tape 13 passes by the five openings 7, 8, 9 and 9, 9 so it is exposed from the cassette housing 3 at the head insertion opening 7, the pinch roller insertion openings 8, 8 and the tape guide insertion openings 9, 9.

A housing and a limit link will be described with reference to FIGS. 1-4 and FIGS. 8-10.

As shown in the figures, there is shown a housing 15 of the cassette tape player 1, which includes a housing body 16, a lid 17 and one portion of a main chassis which will be described later. The housing 15 has a thin, box-shaped configuration that is larger than the cassette housing 3 of the tape cassette 2.

The housing body 16 has a substantially rectangular, flat plate-shaped bottom plate 18 and a peripheral wall 19 formed from an outer peripheral edge of the bottom plate 18. The housing body 16 forms a thin, box-shaped configuration with its upper side opened. Mode selection buttons and other operation buttons, 20, 20, . . . are provided on the peripheral wall 19.

Figure 2:
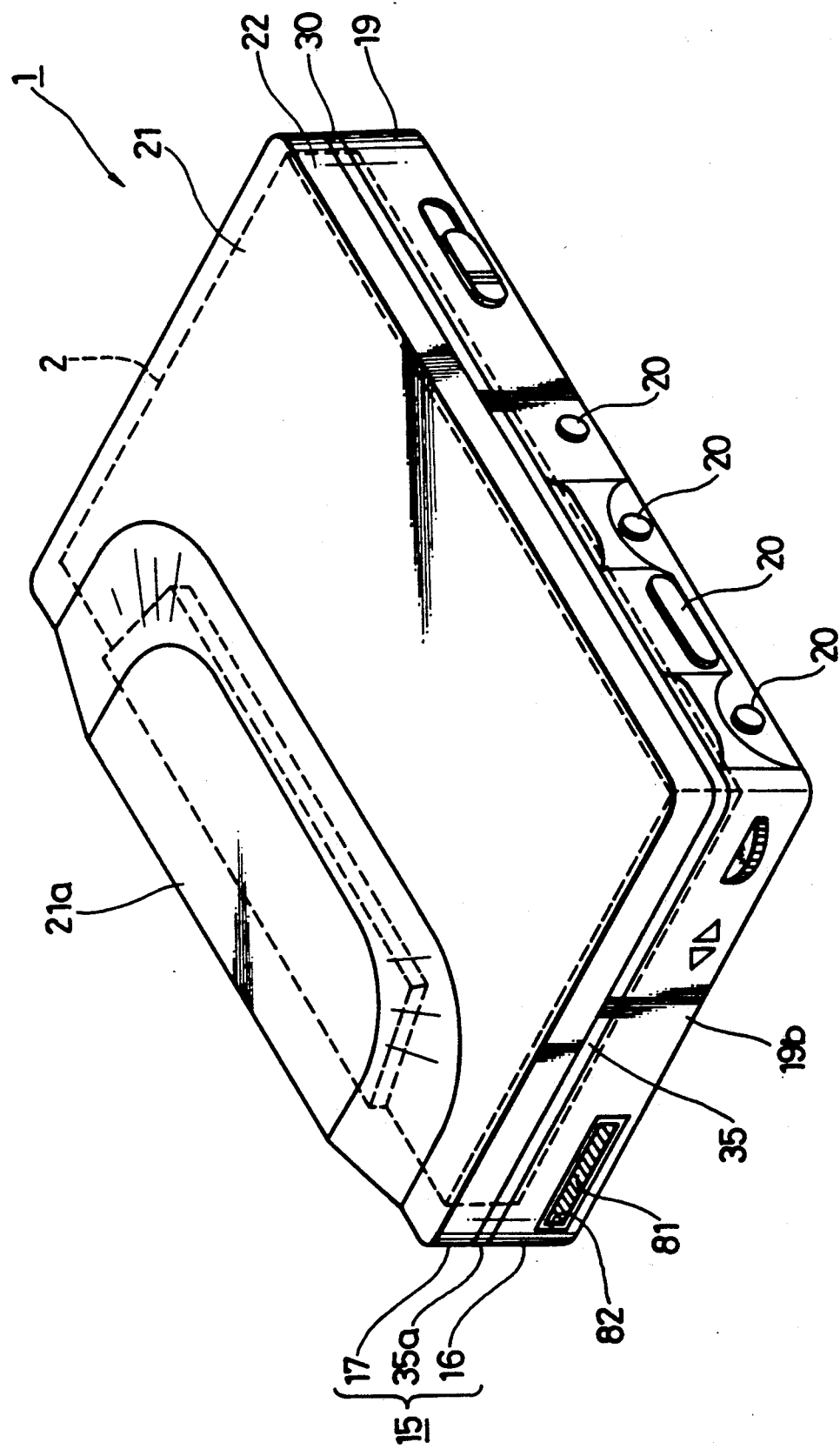
FIG. 2 is a perspective view of an overall arrangement of the cassette tape player with the lid in a closed position.

The lid 17 includes a top plate 21, which is substantially the same size as the bottom plate 18, and a peripheral wall 22 having a small height formed from an outer peripheral edge of the top plate 21. The lid 17 forms a tray-like configuration with its lower side opened. A thick portion 21a is formed on the top plate 21. The left and right end portions of the rear side portion of the top plate 21 remain the same thickness as the rest of the lid. The thick portion 21a is substantially the same size and shape as the thick portion 6 of the cassette housing 3, only slightly larger. In FIG. 2 the upper left side corresponds to the rear side, the lower right side corresponds to the front side, the lower left side corresponds to the left-hand side and the upper right side corresponds to the right-hand side.

A rear side portion 22a of the peripheral wall 22 of the lid 17 is secured to the head assembly chassis, which is supported to the rear end portion of the housing body 16 so as to become substantially rotatable in the vertical direction. The lid 17 is rotatably movable between the closed position as in FIG. 2 for closing the upper opened portion of the housing body 16 and the opened position as in FIG. 3 in which the lid 17 is opened relative to the upper opened portion of the housing body 16 by about 70 degrees.

There is shown a limit link 23 which couples the housing body 16 and the right side portion of the lid 17. The limit link 23 includes two rotating arms rotatably coupled and two attaching members respectively coupled to these rotating arms. The limit link 23 will be described more in detail below.

Figure 3:
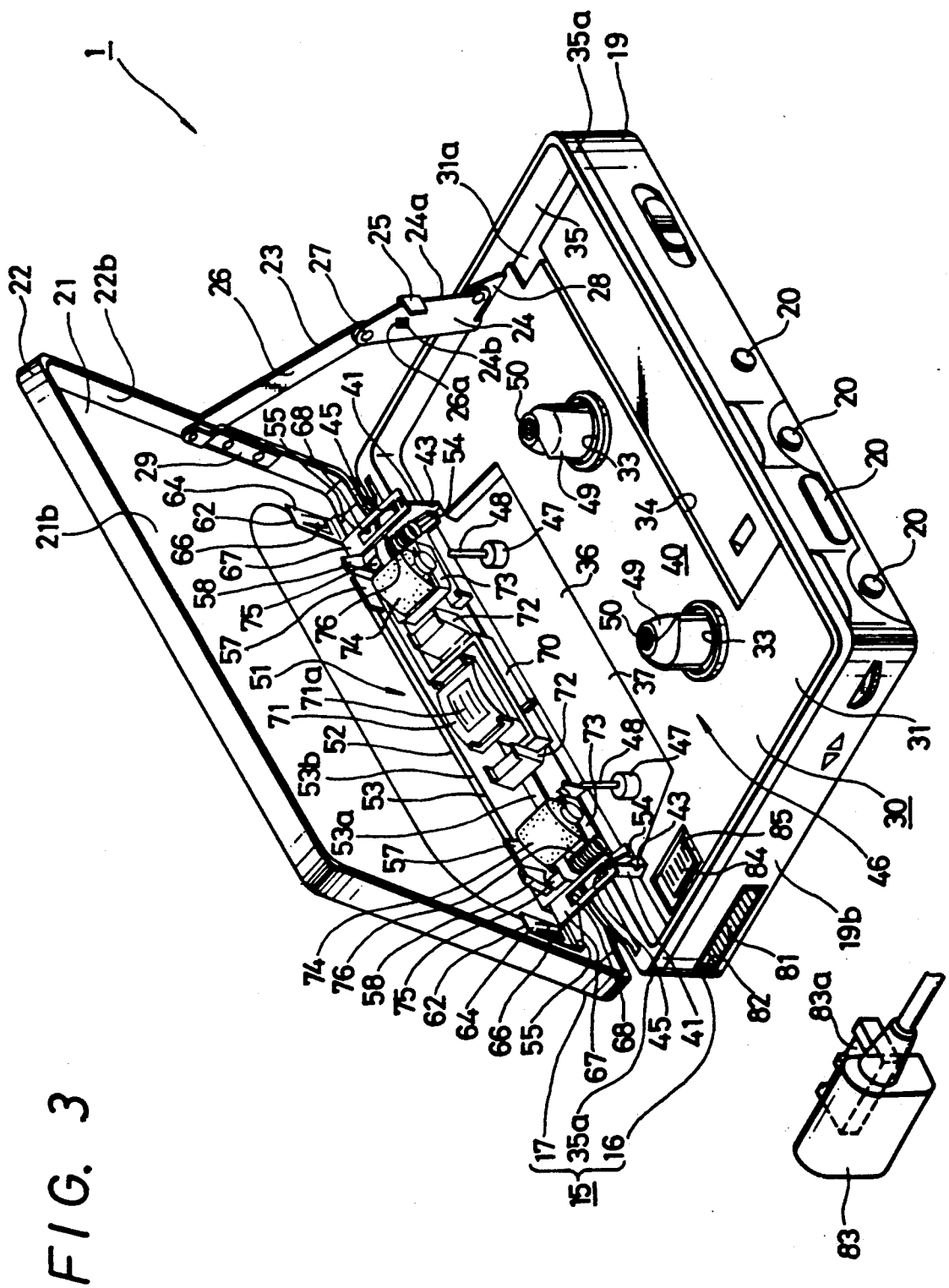
FIG. 3 is a perspective view of the overall arrangement of the cassette tape player with the lid in an opened position.
Figure 4:
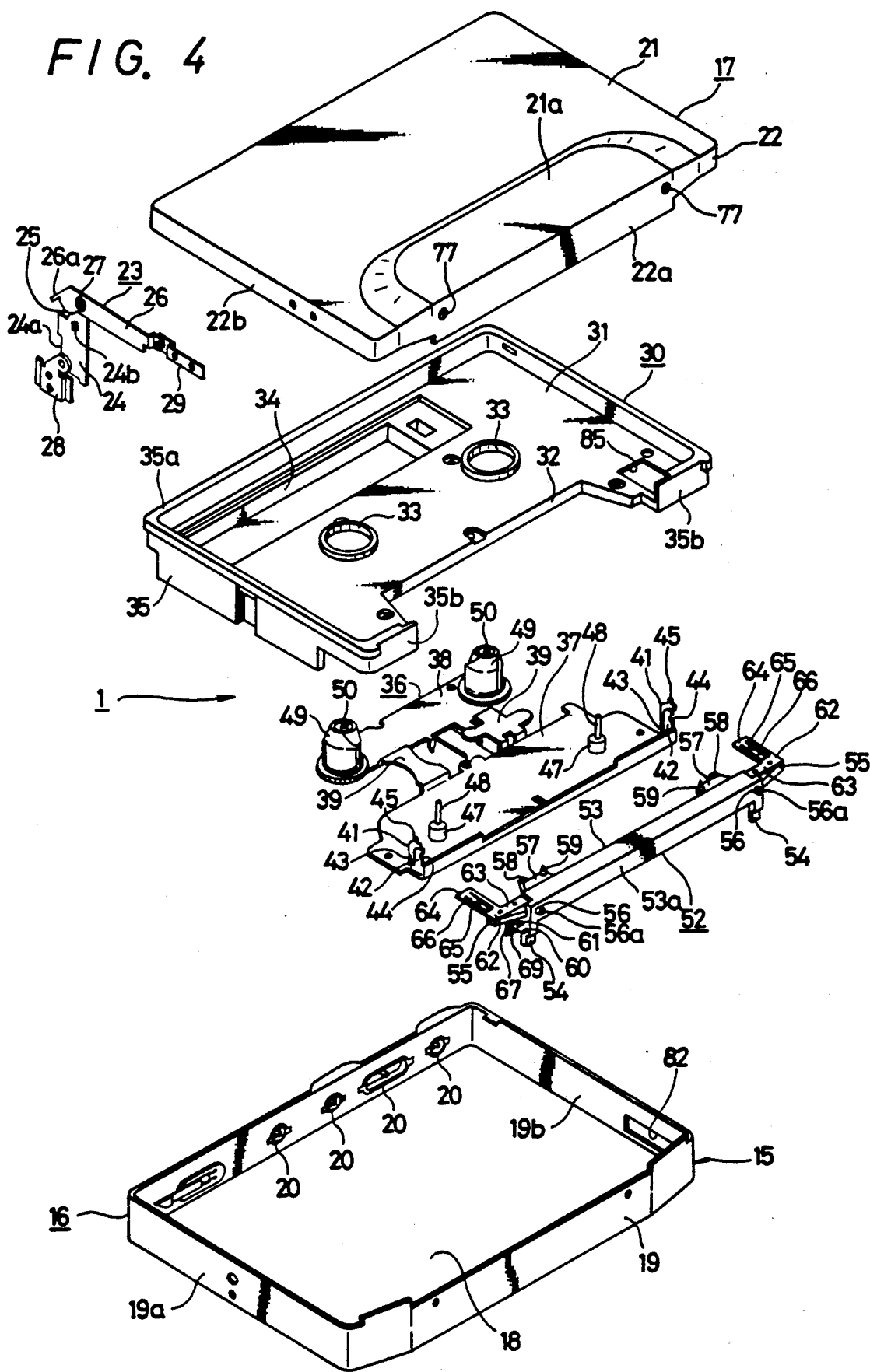
FIG. 4 is a perspective view of the cassette tape player with major portions exploded.
Figure 5:
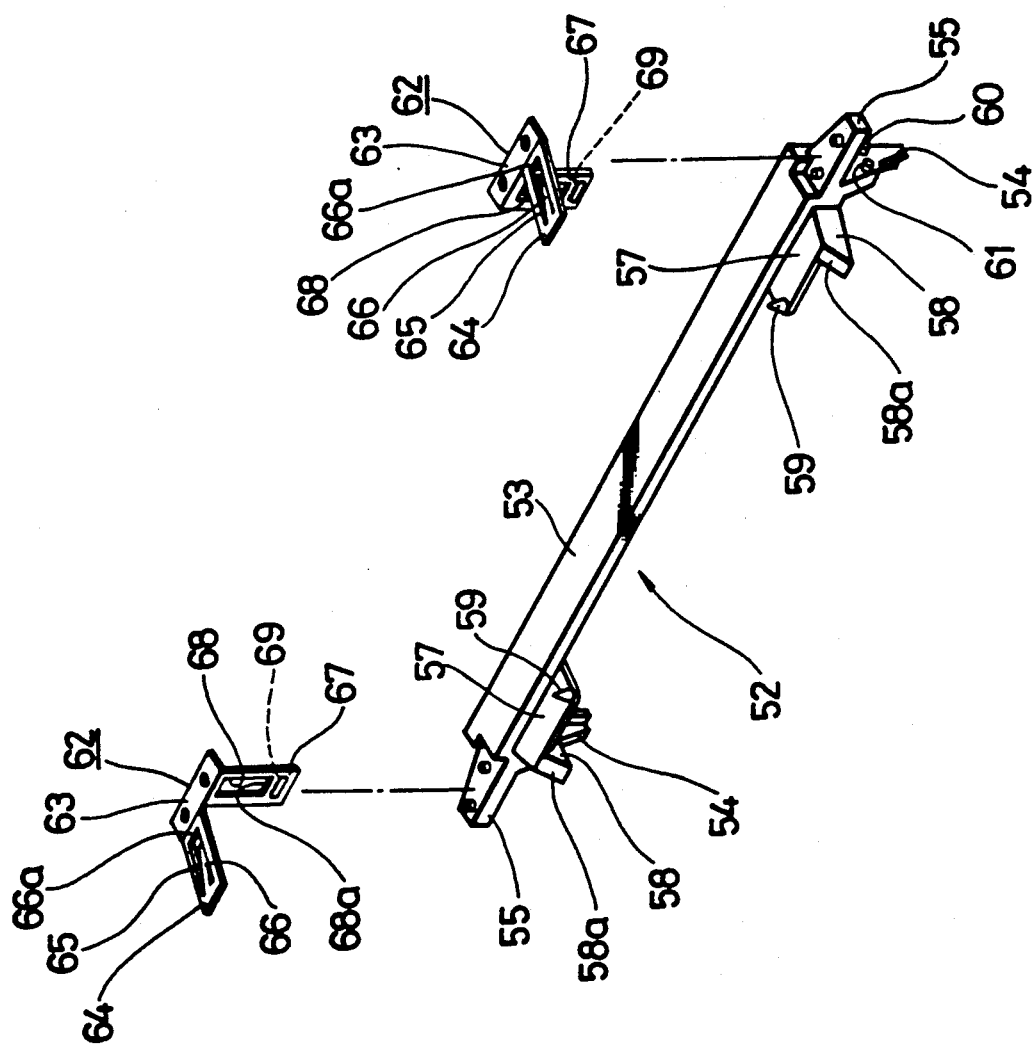
FIG. 5 is a perspective view showing the head portion chassis and the leaf spring members.
Figure 6:
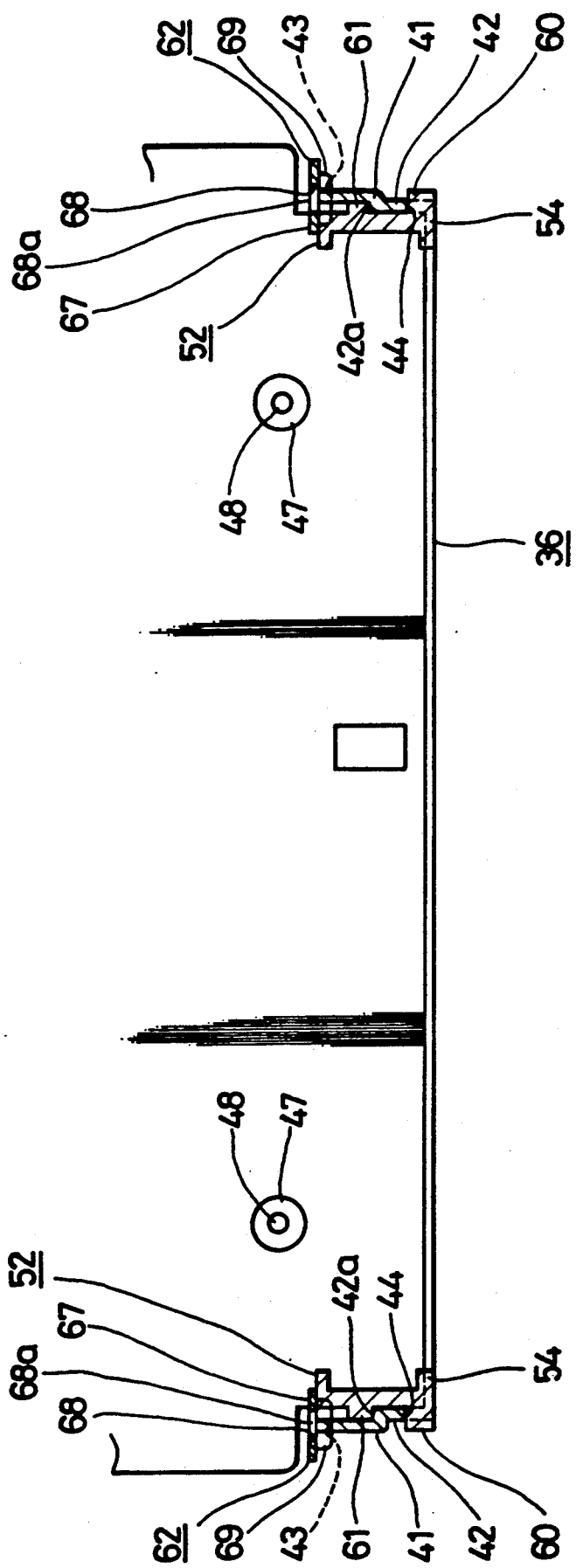
FIG. 6 is a horizontal, cross-sectional view of the head portion chassis what is held on the mechanical chassis.

As shown in FIGS. 3 and 4, lower rotating arm 24 has a wide plate-shaped configuration and has a mis-loading preventing member 25 formed from the same plate so that is protrudes from one side edge 24a of the lower rotating arm 24 which is in the middle portion of the arm lengthwise. The lower rotating arm 24 has an engaging aperture 25b formed therethrough at one end. An upper rotating arm 26 of the limit link 23 has a plate configuration which is slightly longer than the lower rotating arm 24. A small engaging lever 26a protrudes from one end of the upper rotating arm 26. The tip end of the engaging lever 26a is slightly curved in a leftward direction. One end portion of the lower rotating arm 24 and one end portion of the upper rotating arm 26 overlap each other and are rotatably coupled by a rivet 27. An attaching member 28 is rotatably coupled to the end portion of the lower rotating arm 24 which is not coupled to upper rotating arm 26. An attaching member 29 is rotatably coupled to the end portion of the upper rotating arm 26 not coupled to lower rotating arm 24. The attaching member 28 of the lower rotating arm 24 is secured to the center of the inner surface of the right side portion 19a of the peripheral wall 19 of the housing body. The attaching member 29 of the upper rotating arm 26 is secured to the center of right side portion 22b of the peripheral wall 22 of the lid 17.

Figure 9:
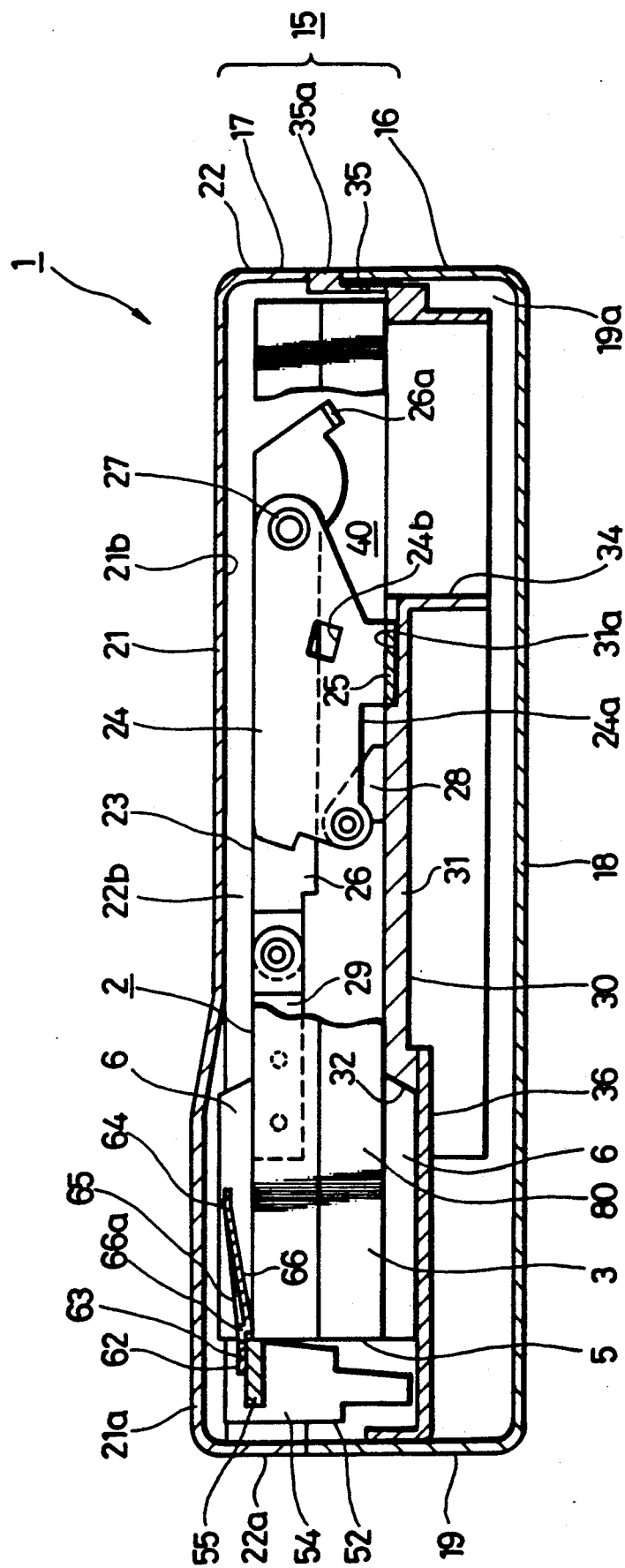
FIG. 9 is a diagrammatic view of the tape cassette player with the tape cassette loaded onto the cassette loading portion.

Thus, when the lid 17 is in its closed position, the two rotating arms 24 and 26 are folded in an overlapping fashion as shown in FIG. 9. When the lid 17 is opened, the two rotating arms 24 and 26 are gradually extended through the locus of a substantially V-letter shaped configuration. When the lid 17 reaches its opened position as shown in FIG. 1, the two rotating arms 24 and 26 are positioned so as to form a C-like shape and the tip end of the engaging lever 26a of the upper rotating arm 26 is engaged with the engaging aperture 24b of the lower rotating arm 24 to lock the rotating arms 24 and 26 in place.

In the locked position, the rear end of the end edge of the lower rotating arm 24 that is coupled to attaching member 28 also comes in contact with the upper wall of a cassette holding plate, which will be described later, to prevent the lid 17 from opening more than 70 degrees. Also, the mis-loading preventing member 25 is located at a position slightly higher than the upper end of a reel table, which will be described later, such that is vertically situated and protrudes in a rightward direction.

Further, when reaching its closed position, the lid 17 is locked at its closed position by a locking means (not shown) provided at the housing body 16.

The chassis and the cassette loading portion will be explained with reference to FIGS. 1-4 and FIGS. 6-10.

In the figures, reference numeral 30 designates a main chassis. The main chassis 30 is formed by molding a synthetic resin into a cassette holding plate on which the tape cassette 2 is detachably held. A peripheral wall portion forming one portion of a peripheral wall of the housing 15 assists in securing the tape cassette.

As shown in FIG. 4, a cassette holding plate 31 is formed as a flat-shaped plate having an outer configuration slightly larger than the configuration of the tape cassette 2 when viewed from the side. A cut-away portion 32 is formed in the cassette holding plate 31 in the rear edge portion of the cassette holding plate 31. The size and shape of the cut-away portion 32 is substantially the same as that of the thick portion 6 of the cassette housing 3. Two circular insertion apertures 33 and 33 are formed through the cassette holding plate 31 at its center portion and positioned from each other the same distance as the two tape reels 4, 4 of the tape cassette 2 are positioned from each other. Further, a rectangular battery accommodating aperture 34 is situated with a long side of the rectangle formed near the front side wall of the cassette holding plate 31. Aperture 34 does not extend completely across the length of cassette holding plate 31, it does not extend completely to the left edge. A shallow concave portion 31a (refer to FIG. 9) is formed near the right side end portion of the cassette holding plate 31.

A peripheral wall 35 is formed along the outer peripheral edge of the cassette holding plate 31 except in the region of the cut-away portion 32. The left side portion and the rear side portion of the peripheral wall 35 protrude upward from the cassette holding plate 31, and most of the right side portion and the front side portion of the peripheral wall 35 protrude upward and downward from the cassette holding plate 31. An upper end portion 35a of the wall 35 is slightly protruded outward to form a lip.

The main chassis 30, except the upper end portion 35a of the peripheral wall 35, engages with the peripheral wall 19 of the housing body 16. The upper end portion 35a is placed on the upper end edge of the peripheral wall 19 of the housing body 16. In this arrangement, the upper end portion 35a is fixed to the housing body 16 at several places.

When the limit link 23 is folded, its mis-loading preventing member 25 sits horizontally within the shallow concave portion 31a formed on the cassette holding plate 31.

As shown in FIG. 4, there is provided a mechanical chassis 35 which is made of a metal plate. The mechanical chassis 35 includes a rear portion 37 having a plate-shaped configuration of a size substantially equal to the cut-away portion 32 formed on the cassette holding plate 31 of the main chassis 30. Also included is a front portion 36 having a plate-shaped configuration that is narrower than the rear portion 37 and intermediate portions 39, 39 which couples these rear and front portions 37 and 38 together. The mechanical chassis 36 is secured to the main chassis 30 at several places by a suitable fashion such as screws (not shown). With the mechanical chassis in place, the rear portion 37 fills the gap left from cut-away portion 32 from below the cassette holding plate 31.

As shown in FIGS. 1-9, the main chassis 30 and the mechanical chassis 36 are located within the housing body 16 at approximately mid-height to form a thin cassette loading portion 40 having the upper surface of the cassette holding plate 31 as a bottom wall and the upper portion of the housing body 16 as the opened portion. The opened portion of the cassette loading portion 40 is closed by the lid 17. When the lid 17 is in its closed position, the cassette loading portion 40 and the lid 17 form a space large enough to accommodate the tape cassette 2.

Since the upper end portion 35a of the peripheral wall 35 of the main chassis 30 is held on the upper end edge of the peripheral wall 19 of the housing body 16, this upper end portion 35a forms one portion of the peripheral wall of the housing 15.

As shown in FIG. 4, supporting members 41, 41 are mounted on respective ends of the rear end portion of the mechanical portion 37 to support the head assembly chassis which will be described later. These supporting members 41, 41 are described below. They are small plates which are substantially rectangular in shape with long sides in the vertical direction. These plate supporting members 41, 41 lie in the same plane as side walls 19a and 19b. The rear half of these supporting members 41, 41 are inwardly protruded to provide guide portions 42, 42. In other words, the guide portion 42 of the left supporting member 41 protrudes to the right while the guide portion 42 of the right supporting member 41 protrudes to the left. As shown in FIGS. 7 and 8, upper ends of front edges 42a, 42a of the guide portions 42, 42 are each curved so as to form an arc-like shape at the positions near the upper ends of the supporting members 41, 41. Engaging slits 43, 43 are formed on the supporting members 41, 41 at positions near their lower end portions and the engaging slits 43, 43 are C-letter in shape. Supporting slits 44, 44, which are substantially semi-circular in shape, are formed on the upper portions of the rear side edges of the guide portions 42, 42, respectively. Further, stopper protrusions 45, 45 protrude upward from the supporting members 41, 41 at the positions near their front ends of the upper end edges.

The supporting members 41, 41 are, when the mechanical chassis 36 is secured to the main chassis 30, positioned to be brought in contact with the inner end faces of the rear side portions 35b, 35b of the peripheral wall 35 of the main chassis 30. The side end portions of the rear side portions 35b, 35b of the peripheral wall 35 at the side of the supporting members 41, 41 are reduced in thickness so that the inner surfaces thereof are located slightly behind the other portions.

In FIG. 1 and FIGS. 3-10, reference numeral 46 designates a recording and reproducing portion.

A capstan and a reel table will be explained with reference to FIGS. 3, 4, 6, and 10.

Referring to the figures, it will be seen that bearings 47, 47 are secured to the rear portion 37 of the mechanical chassis 36 at the positions apart from each other in order to match up with apertures in the cassette housing 3. Capstans 48, 48 are rotatably supported at the center of bearings 47, 47. Reel tables 49, 49 are rotatably supported by rotary shafts 50, 50 which protrude upward from opposite ends of the front portion 38 of the mechanical chassis 36. The reel tables 49, 49 then protrude upwardly through the insertion apertures 33, 33 formed through the cassette holding plate 31.

In FIG. 1 and FIGS. 3-9, reference numeral 51 designates a head section which includes a head assembly chassis 52 rotatably supported on the mechanical chassis 36, a magnetic head holder and a pinch roller arm supported to the head assembly chassis, etc.

A head assembly chassis 52 will be explained first with reference to FIG. 1 and FIGS. 3-9.

The respective portions of the head assembly chassis 52 are integrally formed by molding a metal material in a process such as aluminum alloy die casting.

Reference numeral 53 designates a main portion of the head assembly chassis 52, which is a rectangular plate with long sides parallel to the rear end of the mechanical chassis 36. Leg portions 54, 54 project downward from the respective right and left ends of the main portion 53, and spring attaching portions 55, 55 are mounted horizontally from the leg portions 54, 54 at a position near the upper ends of the outer side surfaces of the leg portions 54, 54. A rear side portion 53a of the main portion 53 is curved in a downward fashion (see FIG. 4), and very small protruded portions 56, 56 protrude from the right and left ends of the curved portion 53a, respectively. Screw apertures 56a and 56a are formed through the very small protruded portions 56, 56.

Cassette holding members 57, 57 protrude from both ends of the main portion 53 in a substantially horizontal direction. Each of the cassette holding members 57, 57 have a rectangular-plate configuration with its long sides parallel to the main portion 53. These long sides are slightly shorter than the length of the pinch roller insertion openings 8, 8 of the tape cassette 2. The rear ends of the cassette holding members 57, 57 are connected to the lower front end portion of the main portion 53.

Reference numerals 58, 58 designate protruded head protecting portions. The front end portions of the protruded head protecting portions 58, 58 are protruded forward from the outer end portions of the front ends of the cassette holding members 57, 57 and upper surfaces 58a, 58a of the protruded head protecting portions 58, 58 are formed as angled surfaces that slope downward and away from cassette holding members 57, 57.

Protrusions 59, 59 are small scratching cones that protrude upward from the inner end portions of the cassette holding members 57, 57. Small supporting protrusions 60, 60 and guide protrusions 61, 61 are formed on the outer side surfaces and at mid-height of the leg portions 54, 54. These protrusions 60, 60 and 61, 61 are substantially circular in shape when laterally viewed.

In FIG. 1 and FIGS. 3-9, reference numerals 62, 62 designate leaf spring members which are to be attached to the head assembly chassis 52 which includes cassette pressing portions 64, 64 for pressing the tape cassette 2 to the cassette holding plate 31 and restricting portions 67, 67 for defining an opening angle of the head assembly chassis 52.

Attaching portions 63, 63 of the leaf spring members 62, 62 have rectangular, plate-shaped configurations with long sides parallel to main portion 53. The width of attaching portions 63, 63 are the same as the width of the spring attaching portions 55, 55 of the head assembly chassis 52.

Cassette pressing portions 64, 64 protrude slightly upward from the outer half portions of the front edges of the attaching members 63, 63 and rectangular U-letter shaped slits 65, 65 with the open end of the U-shape away from the attaching member. Portions 66, 66 of the cassette pressing portions 64, 64 which are surrounded by the slits 65, 65 are inclined downward and toward attaching members 63, 63 relative to other portions of the cassette pressing portions 64, 64. The portions 66, 66 will hereinafter be referred to as resilient portions. Tip end portions 66a, 66a of the resilient portions 66, 66 are curved slightly upward.

Restricting portions 67, 67 protrude downward from the inner half portions of the front edges of the attaching portions 63, 63. Rectangular apertures 68, 68 with short sides parallel to main portion 53, are formed in the restricting portions 67, 67. Further, small engaging protrusions 69, 69 protrude in a rearward fashion from the lower end portions of the restricting portions 67, 67, respectively.

The attaching portions 63, 63 of the leaf spring members 62, 62 are fixed to the upper surfaces of the spring attaching portions 55, 55 of the head assembly chassis 52. The restricting portions 67, 67 are located adjacent to and below the outsides of the cassette holding members 57, 57 of the head assembly chassis 52 and the cassette pressing portions 64, 64 are located so as to protrude slightly upward from the upper surfaces of both ends of the head assembly chassis 52.

The upper surfaces of the cassette holding members 57, 57 of the head assembly chassis 52 and the lower ends of the resilient members 66, 66 of the leaf spring members 62, 62 are located at approximately the same height.

A magnetic head, a pinch roller and the like will be explained with reference to FIGS. 1 and 3.

A head holder 70 is supported at its right end by the right end portion of the lower surface of the main portion 52 of the head assembly chassis 52 so that it becomes freely rotatable in the front and rear direction, A magnetic head 71 is supported by the head holder 70 at a position near the rotation end, which corresponds to the central portion of the head assembly chassis 52.

Tape guides 72, 72 are supported by the head holder 70 so that they are located on the right and left sides of the magnetic head 71.

Pinch roller arms 73, 73 are shown to rotatably support pinch rollers 74, 74. The pinch roller arms 73, 73 are supported by shafts 75, 75 which are rotatable in the front and rear direction. Shafts 75, 75 protrude from their respective end portion of the main portion 53 of the head assembly chassis 52. In FIG. 3, reference numerals 76, 76 designate torsion springs which are used to press against the pinch rollers 74, 74.

The tip end portions of the head protecting protrusions 58, 58 provided on the head assembly chassis 52 are located in front of the magnetic head 71 or they are located slightly in front of a tape contacting face 71.

The attachment of the head assembly chassis 52 to the mechanical chassis 36 will be explained with reference to FIGS. 3-8.

The head assembly chassis 52 is supported to the supporting members 41, 41 of the mechanical chassis as follows.

Figure 7A:
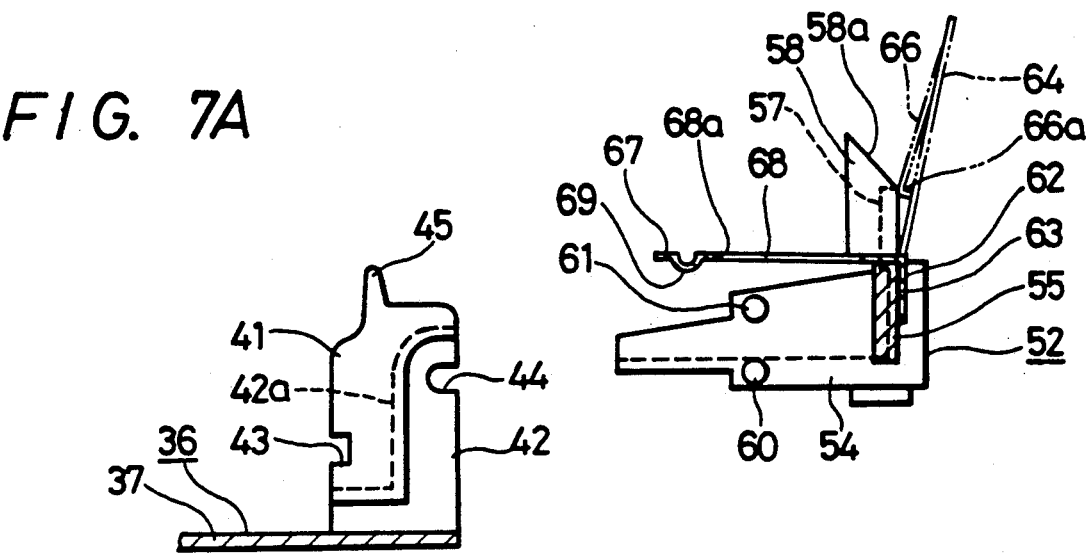
FIGS. 7A-C are cross-sectional views of the head portion chassis on the mechanical chassis during different stages of assembly.
Figure 7B:
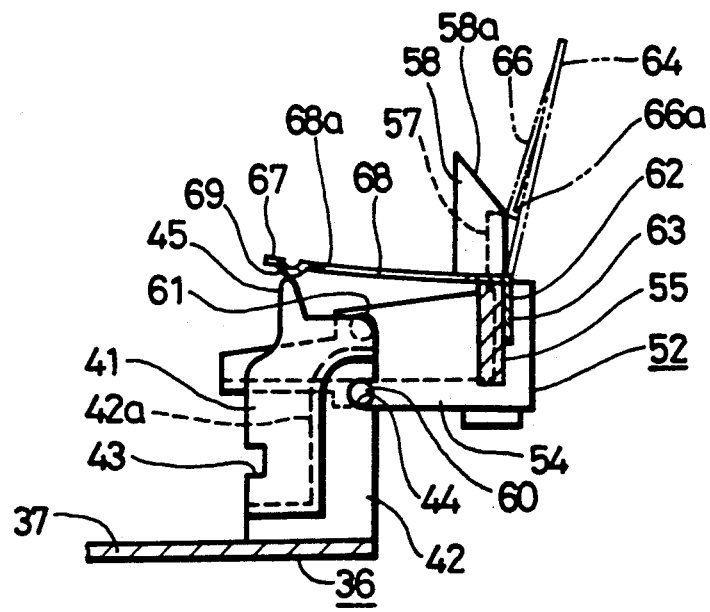
Figure 7C:
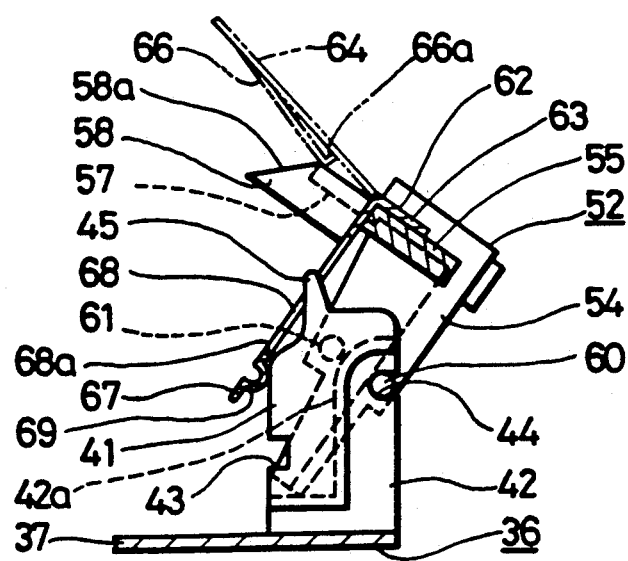

First, the head assembly chassis 52 is attached to the mechanical chassis 36 as shown in FIG. 7A, by fitting the supporting protrusions 60, 60 into the semi-circular-shaped supporting slits 44, 44 formed on the supporting members 41, 41 of the mechanical chassis 36. The guide protrusions 61, 61 lie adjacent to the upper end edges of the guide portions 42, 42 of the supporting members 41, 41. As shown in FIG. 7B, the supporting protrusions 60, 60 are engaged with the supporting slits 44, 44, respectively. Then, the guide protrusions 61, 61 are respectively held on the rear ends of the upper end edges of the guide portions 42, 42 of the supporting members 41, 41 and the tip end portions of the restricting portions 67, 67 of the leaf spring members 62, 62 move downward to the upper ends of the stopper protrusions 45, 45 of the supporting members 41, 41. Therefore, the restricting portions 67, 67 are slightly bent in an upward direction. When the head assembly chassis 52 is rotated in the counter-clockwise direction in FIG. 7, the engaging protrusions 69, 69 move over the stopper protrusions 45, 45 so the restricting portions 67, 67 are released from being bent as shown in FIG. 7C, thus causing the stopper protrusions 45, 45 to be engaged with the rectangular openings 68, 68 of the restricting portions 67, 67. During this part of the assembly, the guide protrusions 61, 61 are engaged with the front side edges 42a, 42a of the guide portions 42, 42 of the supporting members 41, 41.

Figure 8A:
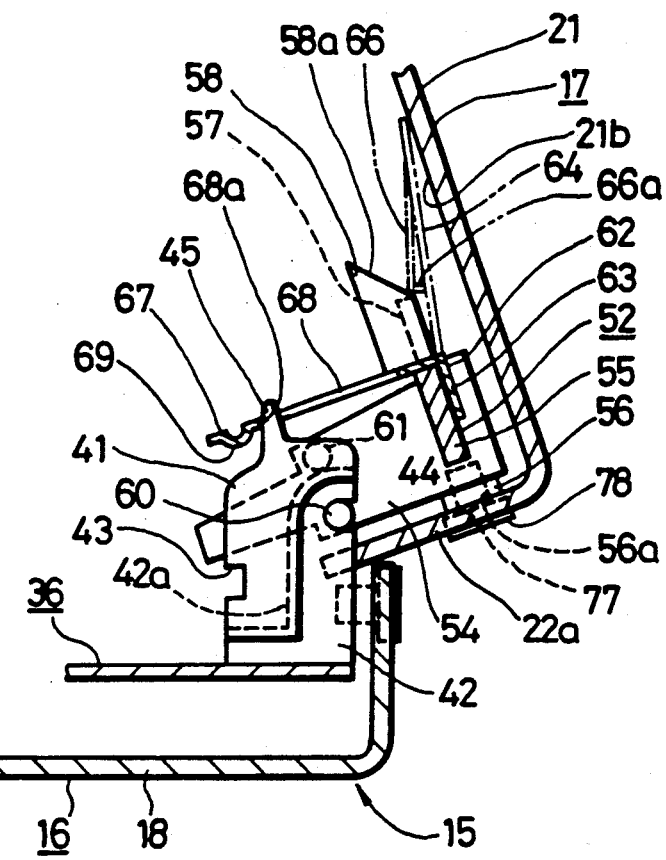
FIG. 8A is a partial cross-sectional view of a section of the cassette holding apparatus with the lid in its opened position.
Figure 8B:
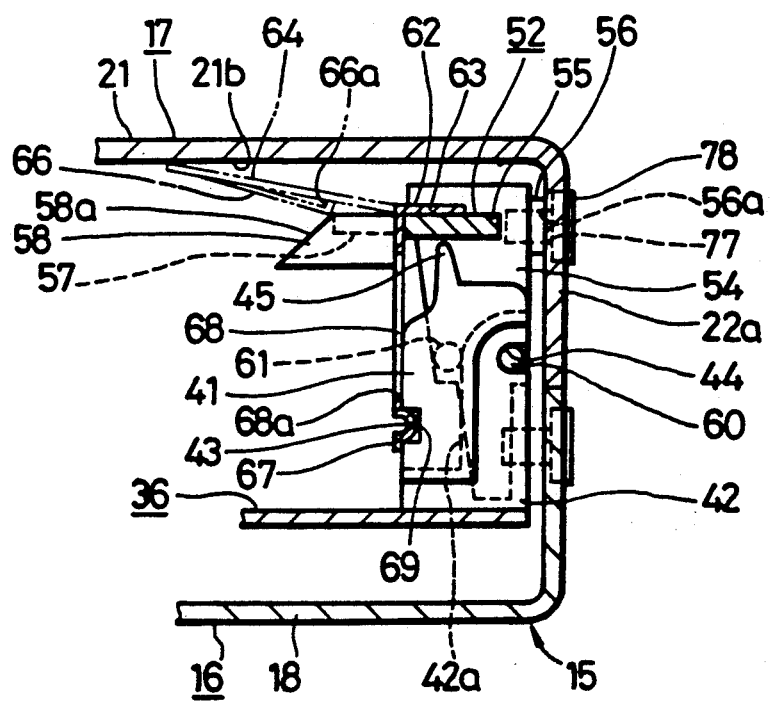
FIG. 8B is a partial cross-sectional view of a section of the cassette holding apparatus with the lid in its closed position.

Therefore, after the head assembly 52 is attached to the mechanical chassis 36, the movement of the guide protrusions 61, 61 are restricted by the front side edges 42a, 42a of the guide portions 42, 42 of the supporting members 41, 41. The guide protrusions 61, 61 are permitted to move only in a substantially vertical direction but they are also restricted from moving rearwardly. Simultaneously, the guide protrusions 61, 61 are restricted from moving in the horizontal direction by opposing side walls of the supporting members 41, 41. Therefore, the head assembly chassis 52, which is supported on the mechanical chassis 36, is freely rotatable to various positions in the supporting protrusions 60, 60 and supporting members 41, 41 arrangement. Further, the stopper protrusions 45, 45 are located so as to intersect the rotation loci of the lower end edges 68a, 68a of the rectangular openings 68, 68 of the restricting portions 67, 67 so that the rotation of the head assembly chassis 52 in the clockwise direction in FIG. 8 is hindered when the lower end edges 68a, 68a of the rectangular openings 68, 68 come in contact with the front edges of the stopper protrusions 45, 45 as shown in FIG. 8A. Further, the rotation of the head assembly chassis 52 in the counter-clockwise direction in FIG. 8 is stopped in a click-stop fashion when the engaging protrusions 69, 69, formed on the restricting portions 67, 67 of the rear spring members 62, 62, are engaged with the engaging slits 43, 43 formed on the supporting members 41, 41 as shown in FIG. 8B.

The assembly process, in particular, of mounting the lid 17 on the head assembly chassis 52 will be explained with reference to FIG. 8.

The lid 17 is secured to the head assembly chassis 52 by engaging screws 78, 78 which are inserted into apertures 77, 77 in the rear side portion 22a of the surrounding wall 22 of the lid 17 and into the apertures 56a, 56a to the main portion 53 of the head assembly chassis 52.

The lid 17, as a result, rotatably coupled to the housing body 16 through the head assembly chassis 52 and the mechanical chassis 36 so that the head assembly chassis 52 can be rotated as one body with the lid 17 when the lid 17 is rotated. Thus, when the lid 17 is set in its opened position, the tape contact surface 71a of the magnetic head 71 faces slightly upward, while when the lid 17 is in its closed position, the tape contact surface 71a of the magnetic head 71 faces forward. Further, the opening angle of the lid 17 is restricted by the restricting portions 67, 67 of the leaf spring members 62, 62 and the supporting members 41, 41 of the mechanical chassis 36.

When the lid 17 is secured to the head assembly chassis 52, as shown in FIG. 8, the tip end portions of the cassette pressing portions 64, 64 of the leaf spring members 62, 62 come in contact with the inner surface 21b of the top plate 21 of the lid 17. The cassette pressing portions 64, 64 and the restricting portions 67, 67 are arranged so the angle between them is slightly larger than 90 degrees as seen from the lateral direction.

Though not shown, below the surface of the main chassis 30 and the mechanical chassis 36, there are gear mechanisms for rotating fly-wheels, which are connected to the capstans 48, 48, reel bases 49, 49, motors for driving these fly-wheels and the gear mechanisms and other control devices.

In the cassette tape player 1 as constructed, the tape cassette 2 will be loaded on the cassette loading portion 40 as follows while avoiding mis-loading.

Securing the tape cassette 2 on the head assembly chassis 52 will be explained with references to FIG. 1.

When the tape cassette 2 is held on the cassette loading portion 40, the tape cassette 2 is held on the head assembly chassis 52. This holding operation is carried out when the lid 17 is in its opened position.

More specifically, when the lid 17 is in its opened position, the tape cassette 2 is moved toward the head assembly 51 side while the front side wall 5 of the cassette casing 3 faces the front of the head assembly 51 (hereinafter, this direction is referred to as the "correct direction"). Then, as shown in FIG. 1, the cassette holding members 57, 57 of the head assembly chassis 52 are inserted into the upper end portions of the pinch roller insertion openings 8, 8 formed through the cassette casing 3, and the resilient portions 66, 66 of the cassette pressing portions 64, 64 of the leaf spring members 62, 62 are brought in very slight resilient contact with the respective positions of the thick portion 6 of the upper wall of the cassette casing 3. The movement of the tape cassette 2 relative to the head assembly 51 is continued until the front side wall 5 of the cassette casing 3 comes in contact with the front end face 53b of the main portion 53 of the head assembly chassis 52. Then, the cone-shaped scratching protrusions 59, 59, which protrude from the cassette holding members 57, 57, are engaged with the front edge portions of the capstan insertion openings 10, 10 of the cassette casing 3.

Therefore, the cassette holding members 57, 57 and the cassette pressing portions 64, 64, of the leaf spring members 62, 62, hold the front side portion of one of the wall portions (11 or 11') which are on opposite sides of the cassette casing 3. The wall 11 facing lid 17, allows the head assembly chassis 52 to hold the tape cassette 2. In FIG. 1, this wall is represented by reference numeral 11 and it will hereinafter be referred to as the "upper surface wall." Further, the ejection of the tape cassette or the movement of the tape cassette 2 when the cassette holding members 57, 57 are released from the pinch roller insertion openings 8, 8 is avoided by engaging the opening edge portions of the capstan insertion apertures 10, 10 with the engaging protrusions 59, 59. Accordingly, as long as the cassette casing 3 is not manually withdrawn from the head assembly chassis 52, the tape cassette 2 can be prevented from being released from the head assembly chassis 52.

When the engaging protrusions 59, 59 are inserted into the capstan insertion apertures 10, 10, the conical surfaces of the engaging protrusions 59, 59 push the front edge portions of the pinch roller insertion openings 8, 8 of the tape cassette 2, move the tape cassette 2 toward the lid 17 by a very short distance while the resilient forces of the resilient members 66, 66 of the leaf spring members 62, 62 are maintained. Thus, when the engaging protrusions 59, 59 are engaged with the capstan insertion openings 10, 10, the tape cassette 2 is pushed back a short distance away form the lid 17 by the resilient forces of the resilient members 66, 66.

If the tape cassette 2 is held on the head assembly chassis 52 when the thick portion 6 of the cassette casing 3 is brought in contact with the inner surface 21b of the top wall 21 of the lid 17, the cassette holding members 57, 57 will be smoothly inserted into the pinch roller insertion openings 8, 8. Even if the tape cassette 2 moves toward the head assembly 52 side without contacting with the lid 17, the front side wall 5 of the cassette casing 3 reaches close to the head assembly 51. The inclined surfaces 58a, 58a of the head protecting protrusions 58, 58, located at the sides of the cassette holding members 57, 57, guide the cassette casing 3 toward the lid 17 side, allowing the pinch roller insertion openings 8, 8 to accept the cassette holding members 57, 57.

At the same time when the cassette holding members 57, 57 of the head assembly chassis 52 are inserted into the pinch roller insertion openings 8, 8, the front wall portion of the magnetic head 71 is inserted into the head insertion opening 7 of the cassette casing 3, the pinch rollers 74, 74 are inserted into the pinch roller insertion openings 8, 8 and the tape guides 72, 72 are inserted into the tape guide insertion openings 9, 9.

The steps for loading the tape cassette into the cassette loading portion will be explained with reference to FIG. 9.

When the lid 17 is moved to its closed position with the tape cassette 2 loaded onto the head assembly chassis 52, as shown in FIG. 9, the cassette casing 3 is held on the cassette holding plate 31 of the main chassis 30 and the reel tables 49, 49 are inserted into the tape reels 4, 4. Also, the capstans 48, 48 are inserted into the capstan insertion apertures 10, 10.

The cassette casing 3 is pressed against the cassette holding plate 31 by the cassette pushing portions 64, 64 of the leaf spring members 62, 62. More specifically, when the lid 17 approaches the position just before its closed position, the restricting portions 67, 67 of the leaf spring members 62, 62 become vertical and are prevented from further rotation by the supporting members 41, 41 of the mechanical chassis 36. The lid 17 is further rotated from this position to reach its closed position, the tape cassette 2 is held on the cassette holding plate 31 slightly before the lid 17 reaches its closed position. The cassette holding members 57, 57 move downward so they are slightly remote from the upper surface wall 11 of the cassette casing 3. Thus, the resilient forces of the resilient portions 66, 66 of the cassette pushing portions 64, 64 act as a pushing force for pressing the cassette casing 3 against the cassette holding plate 31.

Figure 10:
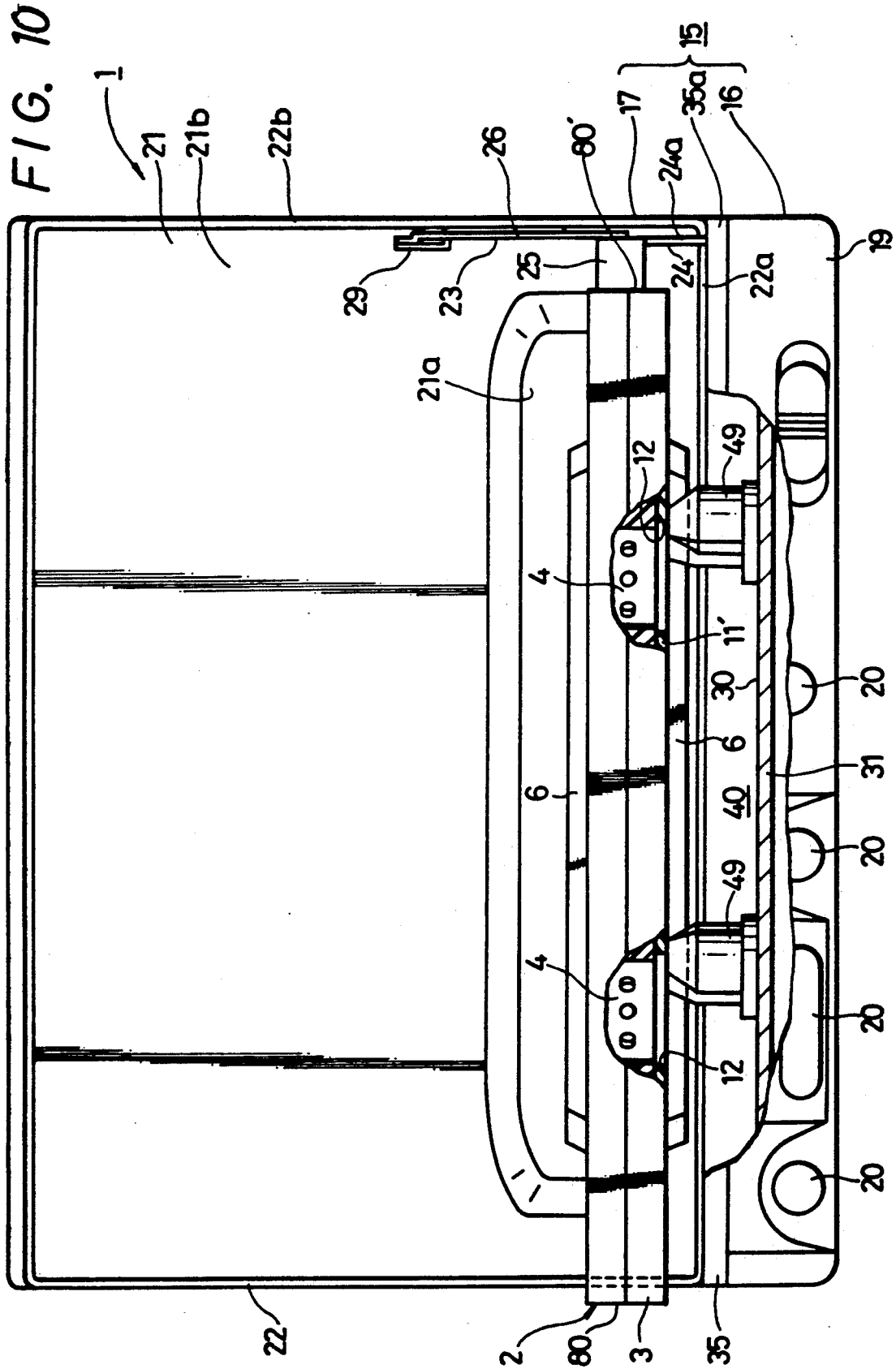
FIG. 10 is a fragmentary, cut-out plan view with the tape cassette loaded onto the cassette loading portion.
Figure 11:
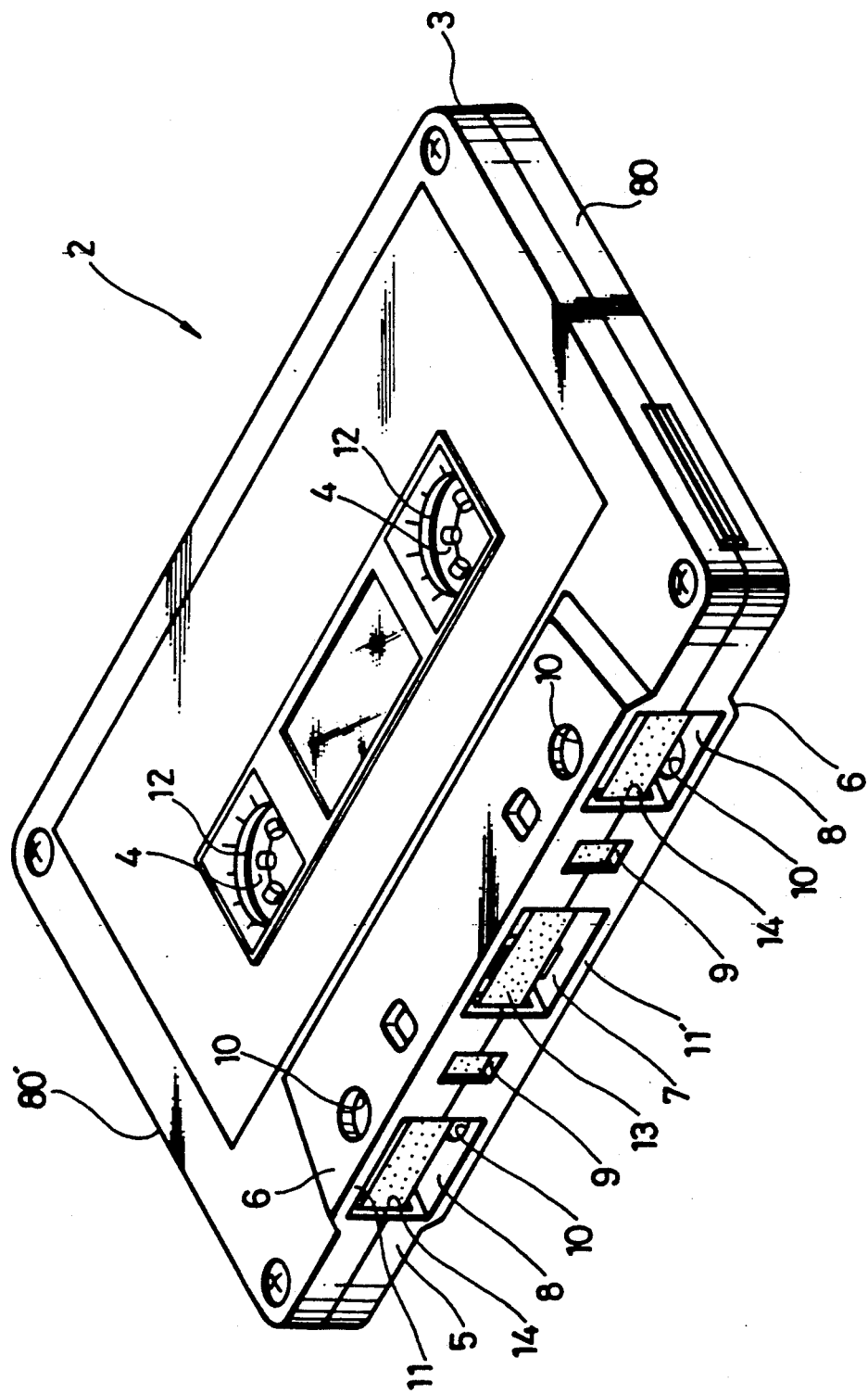
FIG. 11 is a perspective view of the tape cassette.

Avoiding mis-loading the tape cassette 2 will be explained with reference to FIGS. 1 and 10.

The tape cassette is held on the head assembly chassis 52 in the cassette tape player 1 as described above so that, when the tape cassette 2 approaches the head assembly 51 with front side walls facing away from the head assembly chassis 52 (the incorrect direction), the tape cassette 2 is prevented from being held on the head assembly chassis 52. Thus, the user can understand that the direction of the tape cassette 2 is not correct for loading. Therefore, the tape cassette cannot collide with parts of the head assembly 52 such as the magnetic head 71, to cause damage.

The head assembly chassis 52 includes head protecting protrusions 58, 58 as described above so that, even when the tape cassette 2 approaches the head assembly 51 in the opposite direction, the cassette casing 3 can be prevented from abutting against the magnetic head 71 by the above-mentioned head protecting protrusions 58, 58.

As noted earlier, the tip ends of the head protecting protrusions 58, 58 are slightly beyond the tape contacting surface 71a of the magnetic head 71 so that, when the rear wall 79 of the tape cassette 2 approaches the head assembly 51 as shown by a two-dot chain line in FIG. 1, the rear wall 79 comes in contact with the head protecting protrusions 58, 58 before abutting against the magnetic head 71.

Direct loading of the tape cassette 2 on the cassette loading portion 40 without first being held on the head assembly chassis 52 is made impossible by the mis-loading preventing member 25 provided in the limit link 23.

Specifically, when the lid 17 is in its opened position, the above-mentioned mis-loading preventing member 25 is at a position slightly higher than the upper ends of the reel tables 49, 49. Accordingly, if the tape cassette 2 is directly loaded on the cassette loading portion 40, the left wall 80 or the right wall 80' of the cassette casing 3 will come in contact with the mis-loading preventing member 25 as shown in FIG. 10. As a result, one side portion of the cassette casing 3 is displaced laterally to the outside from the cassette loading portion 40 and the positions of the tape reels 4, 4 and the reel tables 49, 49 are similarly displaced from a proper loading position, thus making it impossible to load the cassette casing 3 on the cassette loading portion 40.

Playback operation and the like will be described hereinbelow.

When the tape cassette 2 is loaded onto the cassette loading portion 40, the tape reels 4, 4 are arranged so that they can rotate together with the reel tables 49, 49 as described above. Simultaneously, the magnetic head 71 and the tape guides 72, 72 line up across the magnetic tape 13, and the pinch rollers 74, 74 move adjacent to the capstans 48, 48 with magnetic tape 13 therebetween.

When the play mode is engaged, the head holder 70 moves forward to allow the magnetic head 71 and the tape guides 72, 72 to come in contact with the magnetic tape 13. Also, one of the pinch rollers 74, 74 is moved forward in response to the type of operating mode selected and one of the pinch rollers 74, 74 is pressed against one of the capstans 48, 48 across the magnetic tape 13. Thus, recording or playback is carried out by the magnetic head 71 while the magnetic tape 13 is being transported at a predetermined speed. Then, the magnetic tape 13, transported by the cooperation of the capstans 48, 48 and the pinch rollers 74, 74, is wound around one of the tape reels 4, 4 which is rotated by the reel tables 49, 49.

When a tape fast forward command or a tape rewind command is engaged, only one of reel tables 49, 49 is rotated at high speed, causing the magnetic tap 13 to be transported at high speed from one reel 4, serving as a supply reel, to the other reel 4, serving as a take-up reel.

The effective utilization of space in the cassette tape player 1 of the invention will be explained with reference to FIGS. 2–4.

Cassette holding structures in known cassette tape players hold the cassette casing 3 on both its top and bottom sides. However, in the cassette holding means for holding the tape cassette 2 in the cassette tape player 1 according to the present invention, the tape cassette 2 is held in the cassette tape player 1 by holding only one wall portion of the cassette casing 3, thus removing the member which supports the cassette casing 3 on its bottom side. Therefore, the cassette holding members 57, 57 and the cassette pushing portions 64, 64 of the leaf spring members 62, 62 form the cassette holding structure and are located near the inner top wall 21b of the lid 17. When the lid 17 is moved to its opened position, the bottom surface of the cassette loading portion 40, or most of the upper surfaces of the main chassis 30 and the mechanical chassis 36 may be elevated upward requiring less space. Then, desired members and mechanisms can be easily installed on the bottom surface of the cassette loading portion 40 so they do not obstruct the loading of the tape cassette 2.

Therefore, in this embodiment, an operating member of a connector locking mechanism is supplied at the left end of the rear end portion of the upper surface of the main chassis 30.

Referring to FIGS. 2 and 3, a connector socket 81 is constructed to leave an opening 82 in the left side portion 19b of the peripheral wall 19 of the housing body 16 at its rear end portion. Reference numeral 83 designates a connector plug for external connection and 84 designates a lock member which is fixed to the connector socket 81 so as to become freely slidable in a lateral direction. The lock member 84 is located so as to close an opening 85 formed in the left rear end portion of the main chassis 30 from its under side.

When an insertion portion 83a of the connector plug 83 is inserted into the connector socket 81, the connector plug 83 is locked when an engaging structure (not shown) on the connector plug 83 and the locking member are engaged each other. This locking is released by slidably moving the locking member 84 in a predetermined direction.

Having described a preferred embodiment of the invention with reference to the accompanying drawings in detail, it is to be understood that the present invention is not limited to that precise embodiment, and that various changes and modifications could be effected by one skilled in the art without departing from the spirit and scope of the invention as defined in the appended claims.

We claim as our invention:

1. A cassette holding apparatus for a cassette tape player, comprising:
    a body having a cassette loading region into which is loaded a tape cassette having side wall apertures in its housing where a magnetic head and a pinch roller are inserted;
    a lid rotatably supported by said body;
    a head assembly chassis supporting a head holder for holding said magnetic head and a pinch roller arm which rotatably holds said pinch roller;
    said head assembly chassis is located on an inner surface side of said lid, is coupled to said lid, and rotates in unison with said lid;
    at least one cassette pushing spring mounted between saaid lid and said tape cassette loaded in said cassette loading region for maintaining pressure on an upper surface portion on said tape cassette loaded in said cassette loading region; .
    at least one cassette holding member provided on said head assembly chassis;
    said at least one cassette holding member is inserted into one of said side wall apertures of said tape cassette, so that when said lid moves from an opened position to a closed position, said lid carries said tape cassette; and
    said tape cassette loaded on said cassette loading region is held between said cassette pushing spring and said at least one cassette holding member.

2. A cassette holding apparatus for a cassette tape player according to claim 1, wherein said cassette pushing spring is provided on said head assembly chassis.

3. A cassette holding apparatus for a cassette tape player according to claim 1, wherein said at least one cassette pushing springs comprises a plurality of cassette pushing springs and wherein said at least one cassette holding member comprises a plurality of cassette holding members, to hold said tape cassette; said plurality of cassette holding members are respectively inserted into a plurality of said side wall apertures.

4. A cassette holding apparatus for a cassette tape player according to claim 1, wherein one wall of said housing of said tape cassette is held between said cassette pushing spring and said at least one cassette holding member.

5. A cassette holding apparatus for a cassette tape player according to claim 1, wherein said cassette pushing spring and said at least one cassette holding member are part of an integral head assembly structure, comprising said lid, said magnetic head and said pinch roller.

6. A cassette holding apparatus for a cassette tape player according to claim 1, wherein said cassette pushing spring and said at least one cassette holding member apply pressure to different portions of said tape cassette; said cassette pushing spring and said at least one cassette holding member are located along the rotation axis of said lid.

7. A cassette holding apparatus for a cassette tape player according to claim 1, wherein said at least one cassette holding member has an engaging protrusion which engages with a capstan insertion aperture of said tape cassette when said at least one cassette holding member is inserted into said side wall apertures of said tape cassette.

8. A cassette holding apparatus for a cassette tape player according to claim 1, wherein said at least one cassette holding member is integrally formed with a protruded head protecting member; said head protecting member extends beyond said magnetic head in a lateral direction and beyond said magnetic head in a direction of tape cassette insertion approach;
    wherein said head protecting member prevents contact to said magnetic head when a tape cassette side wall without said apertures moves close to said magnetic head.

9. A cassette holding apparatus for a cassette tape player according to claim 1, further comprising a guide portion provided on said cassette loading region and a restricting portion provided on said head assembly chassis, wherein when said lid is opened relative to said body, said guide portion and said restricting portion are engaged with each other, thereby restricting an opening angle of said lid relative to said body.

10. A cassette holding apparatus for a cassette tape player according to claim 9, wherein said restricting portion and said cassette pushing spring are formed planarly perpendicular to one another as an integral structure and attached to said head assembly.

11. A cassette holding apparatus for a cassette tape player according to claim 1 further comprising:
    a freely foldable link arm arrangement for coupling said body and said lid, providing for folding closure of said lid to said body; and
    a mis-loading preventing apparatus arranged on said link arm arrangement, said mis-loading preventing apparatus arranged so that tape cassette interference with said mis-loading preventing apparatus prevents said tape cassette from direct loading onto said cassette loading region, said tape cassette must first be loaded onto said cassette holding member with said lid in said opened position.

12. A cassette holding apparatus for a cassette tape player comprising:
    a body having a cassette loading region into which is loaded a tape cassette having sidewall apertures in its housing where a magnetic head and a pinch roller are inserted;
    a lid rotatably supported by said body;

cassette holding means for holding a tape cassette and for supporting a head holder, for holding said magnetic head and a pinch roller arm;

said holding means is coupled to said lid for said head holder and said pinch roller arm to rotate in unison with said lid;

a freely foldable link arm arrangement for coupling said body and said lid, wherein when said lid is moved to its closed position after said tape cassette is secured on said cassette holding means while said lid is in its opened position, said tape cassette is loaded on said cassette loading region; and a mis-loading preventing apparatus arranged on said link arm arrangement; said mis-loading preventing apparatus arranged so that tape cassette interference with said mis-loading preventing apparatus prevents said tape cassette from direct loading onto said cassette loading region, such that said tape cassette must be first held on said cassette holding means while said lid is in its opened position, wherein said link arm arrangement is formed of a first arm engaged with said lid and a second arm engaged with said body with said mis-loading preventing apparatus protruding from one of said first arm and said second arm.

13. A cassette holding apparatus for a cassette tape player comprising:
a body having a cassette loading region into which is loaded a tape cassette having sidewall apertures in its housing where a magnetic head and a pinch roller are inserted;
a lid rotatably supported by said body;
cassette holding means for holding a tape cassette and for supporting a head holder, for holding said magnetic head and a pinch roller arm;
said housing means is coupled to said lid for said head holder and said pinch roller arm to rotate in unison with said lid; and
a freely foldable link arm arrangement for coupling said body and said lid, wherein when said lid is moved to its closed position after said tape cassette is secured on said cassette holding means while said lid is in its opened position, said tape cassette is loaded on said cassette loading region; and
a mis-loading preventing apparatus provided on said link arm arrangement; said tape cassette is prevented from direct loading onto said cassette loading region and must be first held on said cassette holding means while said lid is in its opened position, wherein said link arm arrangement is formed of a first arm engaged with said lid and a second arm engaged with said body with said mis-loading preventing apparatus protruding from said second arm.

14. A cassette holding apparatus for a cassette tape player, comprising:
a body having a cassette loading region into which is loaded a tape cassette having sidewall apertures in its housing where a magnetic head and a pinch roller are inserted;
a lid rotatably supported by said body;
a head assembly chassis supporting a head holder for holding said magnetic head and a pinch roller arm which rotatably holds said pinch roller;
said head assembly chassis is located on an inner surface side of said lid, is coupled to said lid, and rotates in unison with said lid;

at least one cassette pushing spring for maintaining pressure on an upper surface portion of said tape cassette loaded in said cassette loading region, said cassette pushing spring provided on said head assembly chassis;

at least one cassette holding member provided on said head assembly chassis, said at least one cassette holding member insertable into one of said side wall apertures, wherein one wall of said housing of said tape cassette is held between said cassette pushing spring and said at least one cassette holding member, so that when said lid moves from an open position to a closed position, said lid carries said tape cassette therewith, wherein said cassette pushing spring and said at least one cassette holding member apply pressure to different portions of said tape cassette, and said cassette pushing spring and said at least one cassette holding member are located along the rotation axis of said lid, said at least one cassette holding member having an engaging protrusion which engages with a capstan insertion aperture of said tape cassette when said at least one cassette holding member is inserted into said side wall aperture of said tape cassette;

said tape cassette is loaded on said cassette loading region while held by said cassette pushing spring and said at least one cassette holding member.

15. A cassette holding apparatus for a cassette tape player according to claim 14, wherein said at least one cassette pushing spring comprises a plurality of cassette pushing springs and said at least one cassette holding member comprises a plurality of cassette holding members to hold said tape cassette;
said plurality of said cassette holding members are respectively inserted into a plurality of said side wall apertures.

16. A cassette holding apparatus for a cassette tape player according to claim 14, wherein said cassette pushing spring and said at least one cassette holding member are part of an integral head assembly structure, comprising said lid, said magnetic head and said pinch roller.

17. A cassette holding apparatus for a cassette tape player according to claim 14, wherein said at least one cassette holding member is integrally formed with a protruded head protecting member;
said head protecting member extends beyond said magnetic head in a lateral direction and extends beyond said magnetic head in a direction of cassette insertion approach;
wherein said head protecting member prevents contact to said magnetic head when a tape cassette side wall without said apertures moves close to said magnetic head.

18. A cassette holding apparatus for a cassette tape player according to claim 14, further comprising a guide portion provided on said cassette loading region and a restricting portion provided on said head assembly chassis, wherein when said lid is open relative to said body, said guide portion and said restricting portion are engaged with each other, thereby restricting an opening angle of said lid relative to said body.

19. A cassette holding apparatus for a cassette tape player according to claim 18, wherein said restricting portion and said cassette pushing spring are formed planarly perpendicular to one another as an integral structure and attached to said head assembly.

20. A cassette holding apparatus for a cassette tape player, comprising:

a body having a cassette loading region into which is loaded a tape cassette having side wall apertures in its housing where a magnetic head and a pinch roller are inserted;

a lid rotatably supported by said body;

a freely foldable link arm arrangement for coupling said body and said lid, providing for folding closure of said lid to said body, wherein said link arm arrangement is formed of a first arm engaged with said lid and a second arm engaged with said body;

a mis-loading preventing apparatus arranged on said link arm arrangement, said mis-loading preventing apparatus arranged so that tape cassette interference with said mis-loading preventing apparatus prevents said tape cassette for direct loading onto said cassette loading region, said tape cassette must first be loaded onto said cassette holding member with said lid in said open position, with said mis-loading preventing apparatus protruding inwardly from said second arm;

a head assembly chassis supporting a head holder for holding said magnetic head and a pinch roller arm which rotatably holds said pinch roller;

said head assembly chassis is located on an inner surface side of said lid, is coupled to said lid, and rotates in unison with said lid;

at least one cassette pushing spring mounted between said lid and said tape cassette loaded in said cassette loading region for maintaining pressure on an upper surface portion on said tape cassette loaded in said cassette loading region;

at least one cassette holding member provided on said head assembly chassis;

said cassette holding member is inserted into one of said side wall apertures of said tape cassette, so that when said lid moves from an open position to a closed position, said lid holds said tape cassette; and said tape cassette is loaded on said cassette loading region while held by said cassette pushing spring and said cassette holding member.

* * * * *